JOHN M. E. VALK.

Improvement in Corn Planters.

No. 124,643.  Patented March 12, 1872.

Witnesses:
J. C. Brecht.
Edmn James

Inventor:
John M. E. Valk.
per J. E. J. Holmead
Attorney.

UNITED STATES PATENT OFFICE.

JOHN M. E. VALK, OF BALTIMORE, MARYLAND, ASSIGNOR TO JOHN E. VALK.

IMPROVEMENT IN CORN-PLANTERS.

Specification forming part of Letters Patent No. 124,643, dated March 12, 1872.

*To all whom it may concern:*

Be it known that I, JOHN M. E. VALK, of the city and county of Baltimore and State of Maryland, have invented certain new and useful Improvements in Corn-Planters, of which the following is a full, clear, and exact description, reference being had to the accompanying drawing and the letters of reference marked thereon making part of this specification, in which—

Figure 1:
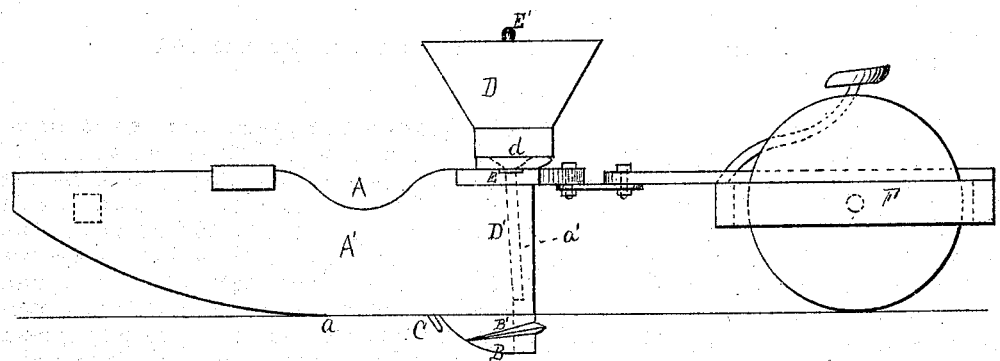
Figure 2:
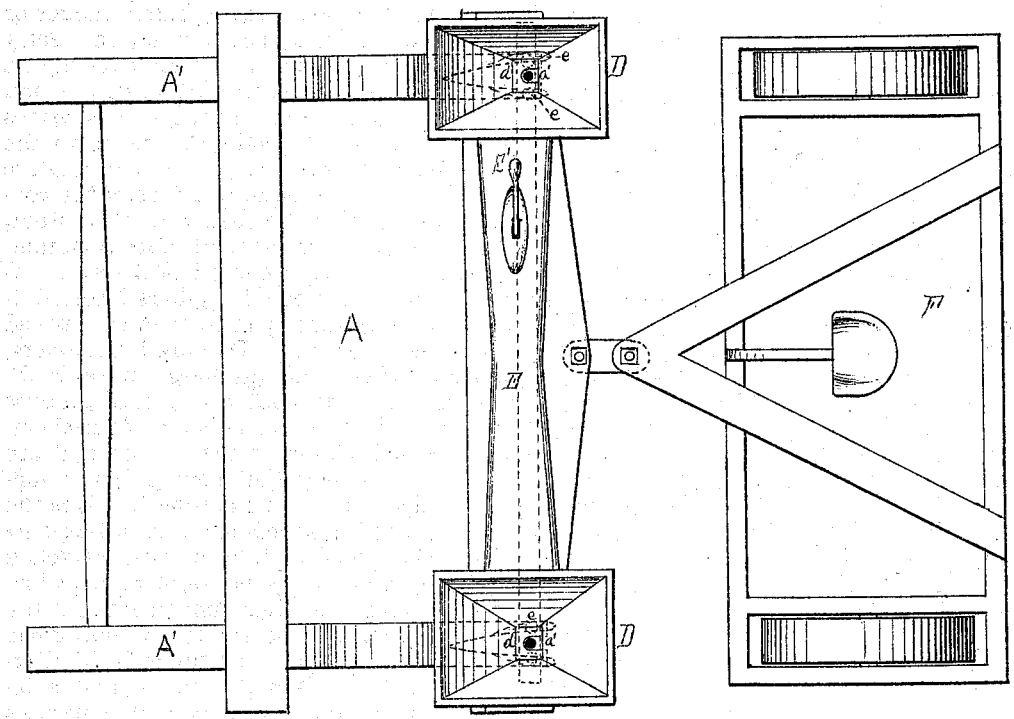
Figure 3:
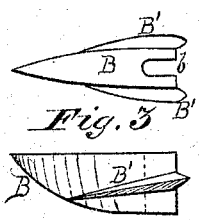

Figure 1 is a longitudinal sectional view. Fig. 2 is a top-plan view. Fig. 3 is a plan and side view of the shoe.

The object of my improvement is to furnish a cheap, durable, and accurate device for planting corn; one that is simple in construction, avoiding all features of a complicated mechanism, and which can be so arranged as to operate with equal effectiveness whether used for planting a double or triple row.

My invention consists in securing, at the rear section of the runner-timbers of an ordinary sled, independent planting-shoes. These shoes are formed with their rear heads slotted, while their front sections are rounded and arched inward, so as to afford a sharp wedge-shaped cutting-surface. This form of shoe, when attached to the broad runners of a sled, as it is drawn over the soil, opens and properly spreads the drill or row for the reception of the corn, which is discharged from the hopper through a tube and dropped through the slotted rear head of the shoe. These shoes are also provided at their opposite sides with annular flanges or ridges, so arranged that after the corn is dropped, through their action the soil shall be so thrown back into the row and over the planted grain as to leave it properly covered and protected.

The construction and operation of my invention are as follows: A is the sled-frame, and is constructed in the usual manner, excepting, perhaps, when the frame is constructed especially to be used in connection with my improved planting-shoes it may be desirable to extend a little the curved sections of the runner-timbers A' A', which permits of the sled being the more readily reversed, turning as it does, when thus constructed, on the points $a$ $a$, as on centers. These runner-timbers, to insure the most effective working of the machine, should be about four inches wide, as they then not only remove all obstructions, but also level the soil for the direct action of the planting-shoes B B. These planting-shoes are constructed of metal or any other suitable material, and in general outline are of the form shown in Figs. 1 and 3—that is, tapering and with their front section rounded and arched inward, so as to leave a sharp cutting-surface in front to open and properly spread the row or drill for the reception of the grain. The rear head of the shoe is rectangular and slotted, as clearly shown at $b$, Fig. 3. The shoe is also formed with angular flanges or ridges B' B' on its opposite sides, as clearly shown in Fig. 3, which may terminate at the rear wall of the shoe, or project a little beyond it, as illustrated in the drawing. These shoes are attached by any suitable means to the lower face of the runner, and at such relative position thereon that the rear face of the runners and shoes shall be flush with each other, the vertical groove $a'$ of the runner communicating directly with the slot $b$ of the shoe. C C are inclined rods or cutting-bars inserted in the runner immediately in front of the curved ends of the shoes B B. D D are the hoppers, and are provided with discharge-tubes D' D', which pass down through the vertical grooves $a'$ $a'$ and empty into the slots $b$ $b$ of the shoes. $d$ $d$ are cut-off plates in the hopper, and are located directly over the opening in the hopper, to which is secured the tube D. E is the sliding bar, and has feed-openings or boxes $e$ $e$ at its opposite ends. E' is a lever, attached to the sliding bar E, by means of which, when desired, a reciprocating movement on the frame A is readily imparted to the sliding bar E, causing the hoppers and tubes D' D' alternately to drop. F is a rear frame, and is designed to carry the hand or boy who operates the lever. This frame F is pivoted to the sled A in such manner as to be easily detached when the machine is to be reversed, so as to be drawn in the opposite direction.

From the foregoing detailed description, the operation of the machine will be readily understood. As about the hoppers D D, cut-offs $d$ $d$, sliding bar E, lever E', and rear frame F there is nothing novel either in their construction, arrangement, or principle of working, I will not refer to the same in detail in describing the operation of the machine. Draft is applied to the sled, and as the broad runners A' A', or, when desired to plant three rows at one and the same operation, an additional runner may be added, are drawn forward, all obstacles are pushed aside by the same, and also by them the ground is properly leveled. The inclined bars C C and shoes B B properly opening and spreading the rows or drills to receive the corn, the same is regularly and alternately dropped simply by moving backward and forward the lever E', so as to impart a reciprocating movement to the sliding bar E, the flanges B' B' returning the soil so as to properly cover the grain.

It will be observed that nearly all the injurious wear and tear incident to the use of the machine necessarily falls on the shoes B B, and as they are independent, when they become worn out at a most trifling expense they can be replaced, and the machine rendered as valuable as when first purchased. Another advantage of this arrangement of independent shoes in connection with the runners is, that no matter how soft or moist the soil is the grain is all deposited at a uniform depth.

What I claim as new, and desired to secure by Letters Patent of the United States, is—

1. The shoes B B, formed as stated, and having slotted heads $b$ $b$ and angular flanges B' B', the whole being so constructed as to permit of their being used in connection with a sled-frame and the other corn-planting mechanism, substantially as described.

2. The runners A' A', independent shoes B B, and angular rods C C, when the whole is combined and arranged so as to operate substantially as described.

In testimony whereof I have signed my name to this specification in the presence of two subscribing witnesses.

JNO. M. E. VALK.

Witnesses:
 EDWIN JAMES,
 JOS. T. K. PLANT.